369-55 SR

OR 3,493,234

SEARCH ROOM

BEST AVAILABLE COPY

Feb. 3, 1970 S. VOSS ET AL 3,493,234

STYLUS ADJUSTING STRUCTURE FOR RECORD PLAYERS

Filed Oct. 21, 1966 4 Sheets-Sheet 1

Feb. 3, 1970 S. VOSS ET AL 3,493,234
STYLUS ADJUSTING STRUCTURE FOR RECORD PLAYERS
Filed Oct. 21, 1966 4 Sheets-Sheet 2

BEST AVAILABLE COPY

BEST AVAILABLE COPY

Feb. 3, 1970 S. VOSS ET AL 3,493,234

STYLUS ADJUSTING STRUCTURE FOR RECORD PLAYERS

Filed Oct. 21, 1966 4 Sheets-Sheet 3

BEST AVAILABLE COPY

Feb. 3, 1970 S. VOSS ET AL 3,493,234

STYLUS ADJUSTING STRUCTURE FOR RECORD PLAYERS

Filed Oct. 21, 1966 4 Sheets-Sheet 4

BEST AVAILABLE COPY

United States Patent Office 3,493,234

Patented Feb. 3, 1970

3,493,234

STYLUS ADJUSTING STRUCTURE FOR RECORD PLAYERS

Sigurd Voss, Kiel, Eckart Kobarg, Fiefbergen, Kreis Plon, and Gustav Maass, Eutin, Germany, assignors to Electroacustic Gesellschaft m.b.H., Kiel, Germany, a corporation of Germany Filed Oct. 21, 1966, Ser. No. 588,617
Claims priority, application Germany, Nov. 17, 1965, E 30,485
Int. Cl. G11b 3/06
U.S. Cl. 274—24 23 Claims

ABSTRACT OF THE DISCLOSURE

A cartridge carrying a stylus is carried by the arm of a record player and is adjustably mounted on the arm. An indicator indicates the proper distance between the stylus and the turning axis of the arm whereby the adjustable mounting may be actuated to move the cartridge with respect to the arm until the stylus is at the proper distance from the turning axis as indicated by the indicator.

Our invention relates to record players.

In particular, our invention relates to that type of record player where a record in disc form is carried by a rotary turntable and has a stylus engaging the recording groove thereof, this stylus in turn being carried by a cartridge mounted on an arm of the record player, as is well known.

The recording groove in a disc record is conventionally formed by a cutting stylus which during its movement with respect to the disc to form the groove therein moves in a strictly radial direction with respect to the disc. However, during reproduction of the sound which is recorded on the disc, the stylus which cooperates with the groove is guided for movement along an arc of a circle whose center is situated to one side of the disc. Because of these differences between the recording of a sound on the disc and the reproduction of the sound, there are unavoidable errors in the picking-up of the recording from the disc and in the reproduction of the sound. Various measures have been taken to reduce these errors, such as giving the arm which carries the stylus a particular configuration, giving this arm a special length, and by providing a suitable location for the vertical turning axis of the arm which carries the stylus. There are, however, still problems encountered in the accurate determination of the geometric relationships required to eliminate these errors as much as possible both in the manufacture of a pick-up cartridge as well as in the exchange thereof. There is a constantly increasing tendency for the user of a record player to be able to use on the record player a particular pick-up cartridge which is selected by the user. Thus, when the cartridge is changed, the new cartridge must provide an arm of suitable length to eliminate as much as possible errors in reproducing the sound. For this purpose it has already been proposed to provide cartridges which can be longitudinally adjusted on the arm of the record player, and the pick-up head is provided with an index with respect to which the stylus of the new cartridge is adjusted so as to provide the proper arm length to cooperate with the record. The distance between this index and the stylus, however, is relatively great and they are situated in different planes. As a result, the adjustment is very unreliable.

Furthermore, it has been observed that satisfactory results are not achieved with the exercise of great care in the adjustment of the stylus with respect to the index at the pick-up head. The reproduction errors which remain result from errors which have not been eliminated from a determination of the proper mechanical length of the arm which carries the stylus, which is to say the proper spacing of the stylus from the turning axis of the arm of the record player. Where a plurality of elements form part of the mounting assembly for a relatively long tone arm, the mass production of these elements results in such large errors in the effective length of the arm that the tip of the stylus is necessarily situated at a location different from the proper location required by the correct geometrical relationship of the components. Moreover, it is hardly possible with mass production techniques to situate the vertical turning axis for the arm at a location which is precisely perpendicular with respect to a supporting plate, so that as a result of this difficulty there are unavoidable errors in the positioning of the stylus.

Our invention is based on the recognition of the fact that the primary source of error resides in the location of the index at the pick-up head. A good adjustment with an arrangement of this latter type does not provide good results. Furthermore, in actual practice unfavorable conditions are encountered as a result of the fact that the index at the pick-up head is usually poorly illuminated and is situated at a location which is not freely accessible, so that adjusting errors result from these latter factors also. Moreover, a checking of the adjustment by the operator after a long period of use of the record player is usually overlooked because the index is not in the normal field of vision of the operator.

It is a primary object of our invention to provide for a cartridge which carries a stylus an adjustable mounting means adjustably mounting the cartridge on an arm means of a record player in such a way that the stylus can be adjusted with respect to an indicating means of our invention which will locate the stylus at the proper distance from the turning axis of the arm means.

In particular it is an object of our invention to provide a means for properly adjusting the location of the stylus irrespective of the type of cartridge which carries the stylus.

Furthermore, it is an object of our invention to provide an arrangement which has excellent visibility so that the operator can easily see when a proper adjustment has been made.

Moreover, it is an object of our invention to provide an arrangement which will continuously remind the operator to check the adjustment of the location of the stylus.

An additional object of our invention is to provide a construction of the above type which is easy to manufacture and easy to mount and assemble.

The record player to which our invention is applied includes a conventional housing having an upper wall, a rotary turntable being situated at this upper wall and having a spindle whose axis coincides with the axis of rotation of the turntable. An arm means is operatively connected with the housing for turning movement with respect thereto about a turning axis which is parallel to the spindle, and during its turning movement the arm means moves over an area part of which is formed by the upper wall of the housing and part of which is formed by the turntable. A cartridge is provided, this cartridge carrying a stylus, and an adjustable mounting means mounts the cartridge on the arm means for movement with respect thereto. An indicating means of our invention is situated at the above-mentioned area to indicate when the stylus is situated at a proper distance from the turning axis of the arm means in response to adjustment of the cartridge with respect to the arm means by actuation of the adjustable mounting means.

Our invention is illustrated by way of example in the accompanying drawings which form part of this application and in which.

Figure 13:
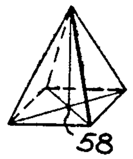
Figures 14, 15:
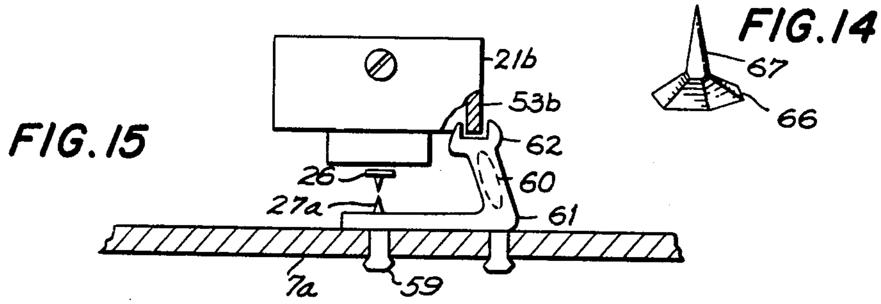
Figure 16:
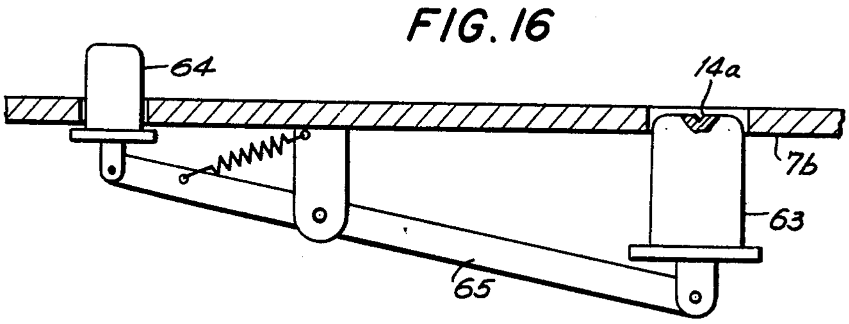

FIGS. 13 and 14 respectively further show perspective illustrations of further embodiments of indicating means according to our invention;

FIG. 15 is a fragmentary section elevation of yet another embodiment of a structure according to our invention; and FIG. 16 shows yet another embodiment of an indicating means of our invention.

Figure 1:
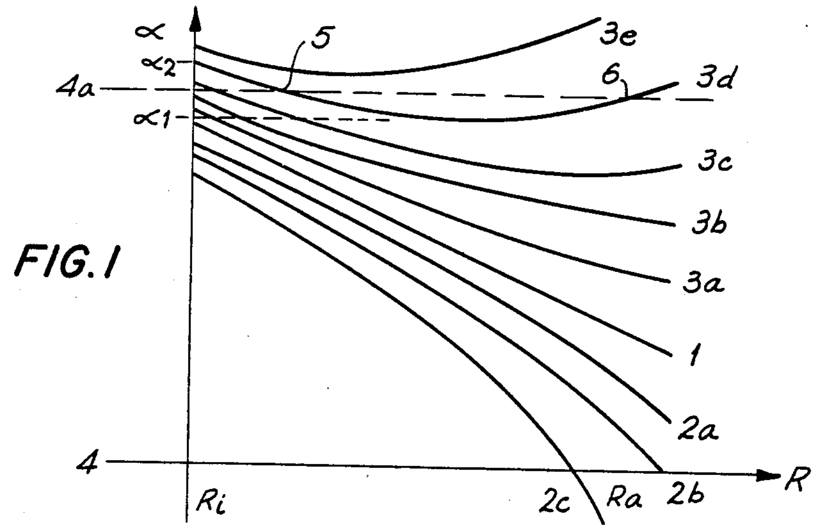
FIG. 1 is a graph illustrating the relationship between the tangent angle $\alpha$ with respect to the groove radius R.

Some of the advantage which can be achieved from our invention will be apparent from a consideration of the graph of FIG. 1. In this graph the tangent $\alpha$ is indicated along the ordinate with respect to the groove radius R which is situated along the abcissa. The abcissa begins at $R_i$ which is greater than 0, corresponding to the innermost groove radius, and the graduations end with $R_a$, which is a graduation corresponding to the largest radius of the outermost groove for the disc record of largest diameter. The tangent angle indicated along the ordinate is the tangent angle formed between the tangent to the unmodulated groove and the longitudinal axis of the pick-up system. Tangent angles which are different from 0 result in the above-discussed introduction of errors in the sound reproduction because of the difference between the conditions under which the grooves are cut and the conditions under which the stylus engages the grooves for playback purposes, these errors, of course, providing undesirable distortions in the sound reproduction. Stereo systems are in particular sensitive to such distortions, since without such sensitivity the stereo effect would be lost.

FIG. 1 shows a family of curves inasmuch as the basic configuration of the curve depends upon the position of the arc of a circle described by the tip of the stylus during playback with respect to the center of the record. The curve 1 will be provided when the tip of the stylus describes an arc of a circle which passes directly through the center of the record. In the event that the arc which is described by the stylus, as it turns about the turning axis of the tone arm, passes in front of the center of the record, then any one of a number of sharply inclined curves 2*a*, 2*b*, 2*c*, etc., will be provided, while if the arc described by the stylus is situated behind the center of the record, then corresponding curves 3*a*, 3*b*, 3*c*, 3*d*, will result, each one of these curves depending upon the particular distance of the stylus either before or behind the center of the record.

Since it is in principle not possible with a cartridge which is carried by a rigid arm which swings about a given axis, this latter feature in itself being of advantage, to avoid a tangent angle which is not equal to 0, it is highly desirable to maintain the variation in the tangent angle $\alpha$ during playback, while the stylus moves along the grooves whose radii range between $R_i$ and $R_a$, as small as possible. It will be seen that from the curve 2*c* up to the curve 3*d*, this variation constantly diminishes, and it is at a minimum in the curve 3*d* which has the minimum range of variation between the limiting values $\alpha_1$ and $\alpha_2$, these limits being indicated in FIG. 1. By providing the arm of the record player with a free end portion carrying the cartridge and extending at a given angle with respect to an elongated portion of the arm which extends radially from its turning axis, it is possible to displace the abscissa 4. The tone arm is therefore designed in such a way that the angle between the portion thereof extending radially from its turning axis and the portion carrying the cartridge is so great that for the curve 3*d* there will be an abscissa or symmetrical zero line 4*a* which is situated symmetrically between the limits $\alpha_1$, $\alpha_2$. The abscissa 4 is applicable only to a straight tone arm. For example, if the tone arm length, from the tip of the stylus to the vertical turning axis thereof, is 23 cm., then the tip of the stylus must describe part of a circle which passes behind the center of the record by a distance of 1.2 cm., in order that the curve 3*d* be provided. If the angle between the cartridge-carrying free end portion of the tone arm and the portion thereof extending radially from its turning axis is on the order 20°, then the advantageous symmetrical location of the new zero line 4*a* is provided. As a result of the relatively horizontal position of the curve 3*d* in connection with the symmetrical location of the line 4*a*, there are provided a pair of zero points 5 and 6 for the tangent angle $\alpha$.

In the event that the structure provided for interchangeable mounting of cartridge or for the mounting of any one cartridge has in its construction an error in the position of the tip of the stylus with respect to the optimum tone arm geometry, then the curve 3*d* will not be obtained and instead an adjoining curve 3*c* or 3*e* will be provided. It is apparent, therefore, that as a result there will be a larger variation in the tangent angle, with a resulting unclear reduction in the quality of the sound reproduction and under certain circumstances with a complete disappearance of the stereo effect.

Furthermore, it is apparent that the error in the location of the tip of the stylus need not be so great that the curve described thereby passes over the center of the record to provide the curve 1, but rather—and this factor is normally overlooked and has been recognized by our invention—even extremely small variations from the ideal position of the stylus tip results in a shifting of the variation limits $\alpha_1$, $\alpha_2$, so that the new zero line 4*a* derived from the angular construction of the tone arm is no longer symmetrically situated between these limits. As a result, assuming that there is in a first approximation an initially remaining variation with $\alpha_2-\alpha_1$, there will be due to the lack of symmetry alone an increase in the maximum absolute amount $\alpha^*$ of the tangent angle which is also a tangent error, as follows:

$$\alpha^* > (\alpha_2 - \alpha_1):2$$

Actually, however, there is in addition a change in the angular position of the optimum curve 3*d*. With larger errors in the location of the stylus, noticeable curvature changes will be produced with even very small errors in the position of the stylus tip, and the result is a very great increase in the variation range of the tangent angle.

BEST AVAILABLE COPY

These are the factors which result in distortions with high quality modern stereo systems, and these distortions can no longer be accepted, unless all other quality-improving expedients are to become illusory.

It is known to provide drives which continuously carry out tangential adjustments of the pick-up system during movement thereof over the record. (See, for example, U.S. Patents 2,455,529, 2,529,676, 2,957,877, etc.) These drives, however, are expensive to manufacture, have a certain play between their components, and require a considerable force to overcome their own inherent friction, which with the presently used or envisioned small force (up to 0.5 pond) with which the stylus tip bears against the record can no longer be dissipated. It has, therefore, already been attempted, my means of a special power source (U.S. Patent 3,059,934) which is itself controlled by the friction force which must be overcome, to take these factors into consideration. The expenditures involved in all of these expedients is however extremely great and the contact arrangement gives rise also to faulty operations.

Figure 2:
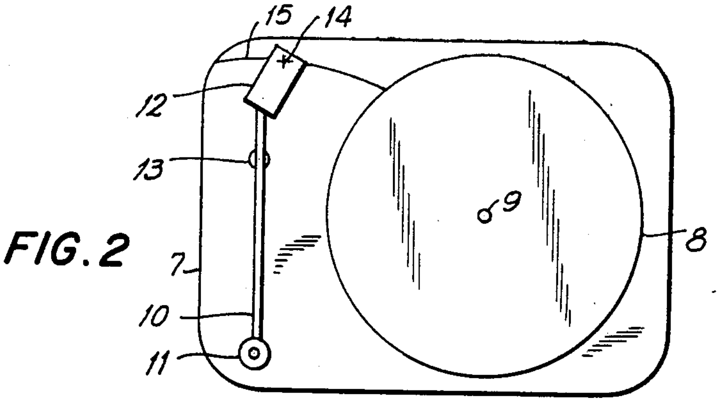
FIG. 2 is a schematic top plan view of one embodiment of a structure according to our invention.
Figure 3:
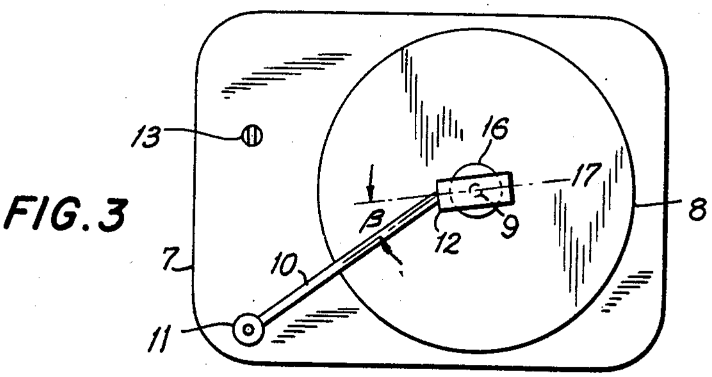
FIG. 3 is a schematic top plan view of another embodiment of a structure according to our invention.

The solution provided by our invention is much simpler. FIGS. 2 and 3 illustrate schematically two possible embodiments of record players according to our invention. In each, the record player is shown in a top plan view.

Referring now to FIGS. 2 and 3, the structure illustrated therein includes a housing having an upper wall 7 at which the rotary turntable 8 is located, this turntable 8 having a spindle 9 whose axis coincides with the axis of rotation of the turntable 8. An arm means 10 is operatively connected at 11 to the housing so that the arm means 10 has a turning axis which is parallel to the spindle 9. The arm means 10 carries the pick-up head 12 at its free end, and this pick-up means or pick-up head 12 includes the unillustrated cartridge which carries the stylus. The pick-up head 12 is not positioned along a radius which extends from the turning axis of the arm means 10, but is instead situated along a portion of the arm means which makes an angle $\beta$ with respect to the portion of the arm means which extends radially from the turning axis thereof, so that the free end of the arm 10 which carries the cartridge is inclined toward the turntable 8. In this way the arm means has the angular construction providing the shifting of the zero line 4 upwardly, as described above in connection with FIG. 1. The upper wall 7 of the housing carries a support means 13 which supports the arm means 10 in its rest position, and in the case where the record player is constructed as a record-changer, the engagement of the arm means with the support means 13 quite often actuates a shut-off switch.

The distance between the spindle 9 and the vertical turning axis of the arm means, the effective length of the arm means, the angle $\beta$, and the location of the vertical turning axis of the arm means at the wall 7 are all factors involved in the geometry of the arm means and which determine the range of variation of the unavoidable tangent error $\alpha$. In order to maintain this geometry with precision, the embodiment of our invention which is shown in FIG. 2 includes an indicating means 14 situated on the upper wall 7 of the housing. The arm means 10 while turning about its vertical turning axis moves over an area part of which is formed by the upper wall 7 and part of which is formed by the turntable 8, and in the example of our invention which is shown in FIG. 2, the indicating means 14 is located at that part of this area which is situated at the upper surface of the upper wall 7. As a result of the presence of the indicating means 14, it is possible even for amateurs, after exchanging one cartridge for another, to properly adjust the location of the stylus of the new cartridge, so as to provide the assembly with a precise geometry for the arm means where the distance between the stylus and the turning axis of the arm means will correspond precisely to the required effective length for the arm means. The indicating means carried by the upper wall 7 can take many different forms. For example, an arc of a circle, such as the arc 15, may be provided in the form of a line or the like imprinted or raised on the upper surface of the wall 7. It is also provided an indicating means in the form of a point of a cross 14, serving as an index at a location along the arc 15 which indicates the proper location for the stylus when the arm means is in its rest position resting on the support means 13 which is carried by the wall 7. The advantage of this latter arrangement is that inasmuch as the arm means is supported in its rest position by the support means 13 when the adjustment of the location of the stylus is carried out, both of the hands of the operator are free for making the adjustment. Of course, the arc 15 itself is also available for use in the rest position of the arm means 10.

In the embodiment of our invention which is illustrated in FIG. 3, the indicating means is situated at that part of the area, over which the arm means moves, which is located at the turntable 8. In this case also the indicating means can take the form of a point or a cross. In this latter event, however, it is necessary to turn the turntable 8 to a predetermined angular position so as to properly locate an indicating means in the form of a point or a mark, and for this reason it is preferred instead to use indicating means in the form of a circle 16 imprinted or otherwise rendered clearly visible on the turntable 8 and coaxially surrounding the spindle 9. It is of advantage when using the indicating means 16 to arrange the pick-up head 12 so that it will rest on the spindle 9, so that on the one hand the hands of the operator will also be free to make the adjustment and on the other hand a predetermined portion of the pick-up head 12 with respect to the circular indicating means 16 can be maintained in order to provide a precise adjustment. In the position illustrated in FIG. 3, the longitudinal axis 17 along which the cartridge can be adjusted in a manner described below intersects the turning axis of the turntable 8, which coincides with the axis of the spindle 9, and the stylus is situated in a plane which contains the axis of adjustment 17. However, the position of the parts illustrated in FIG. 3 is not at all essential, since even if the arm means rests at a location where the pick-up head 12 is situated at a more or less great distance from the spindle 9, it is possible to provide a highly accurate adjustment, corresponding to easily recognizable intersection between the adjusting axis 17 and the circle 16.

Figure 4:
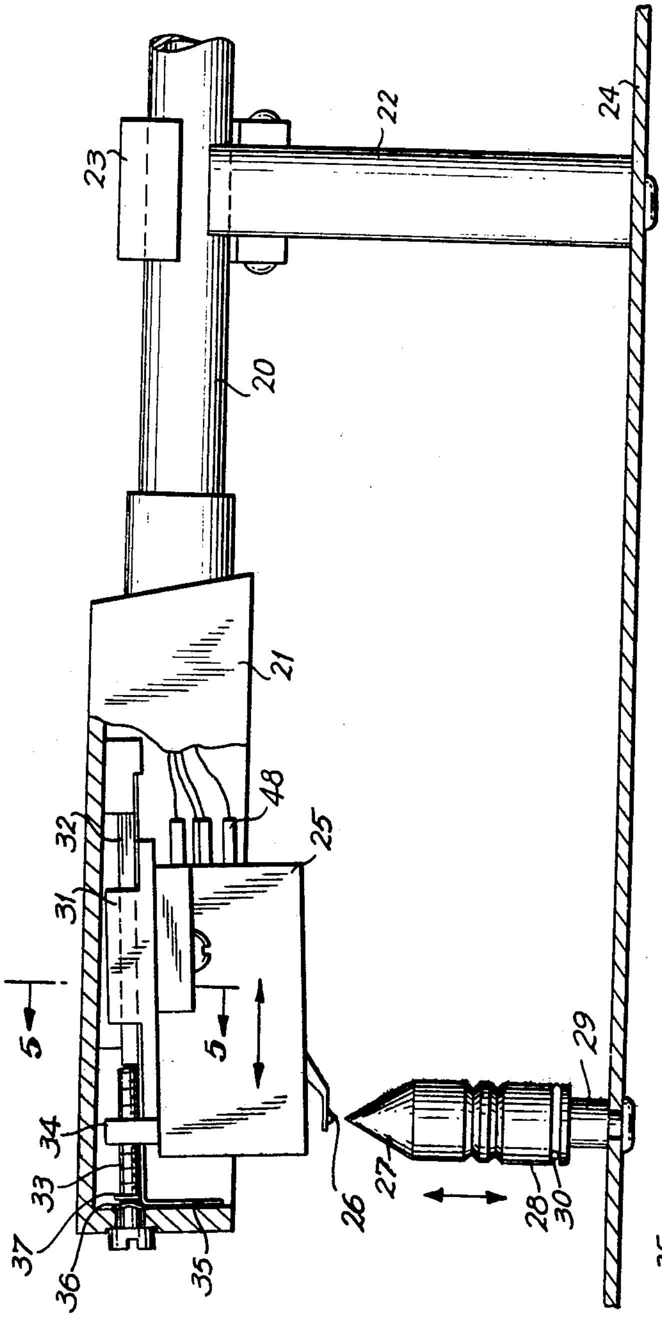
FIG. 4 is a fragmentary longitudinal partly sectional side elevation of that part of a record player of our invention which is situated in the region of the cartridge.
Figure 5:
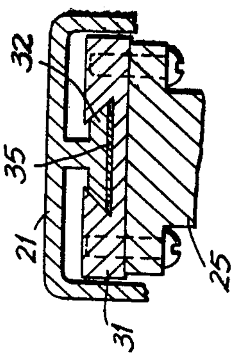
FIG. 5 is a fragmentary transverse section taken along line 5—5 of FIG. 4 in the direction of the arrows.

FIG. 4 illustrates details of an embodiment of a record player of our inventon, these details of FIG. 4 being those which are located in the region of the pick-up head assembly 21 which is shown in a partly sectional longitudinal side view in FIG. 4. The tubular arm means 20 shown in FIG. 4 carries the pick-up head 21, and this arm means 20 extends to the right beyond the portion thereof illustrated in FIG. 4 where it is supported for turning movement about a vertical turning axis while at the same time being swingable up and down, as is well known. The support means 22 which supports the arm means 20 in its rest position is carried by the upper wall 24 of the housing, in the manner indicated in FIG. 4. For example, the support means 22 is riveted to the wall or plate 24. As its upper end the support means 22 is provided with a springy clamp 23 which extends around and grips the arm means 20 so as to reliably secure the latter to the support means 22, and thus the arm means 20 will be maintained in its rest position during transportation of the record player. In its rest position shown in FIG. 5, the arm means 20 necessarily has a predetermined location on the record player, and as a result the cartridge 25 together with the stylus 26 carried thereby also will have a precisely determined location. This precisely determined location is exactly set not only with respect to the angular position about the vertical turning axis of the arm means but also in elevation.

In order to provide a precisely determined geometry for the arm means, which is to say in order to precisely determine the distance of the stylus 26 from the turning axis of the arm means, the structure of FIG. 4 includes an indicating means in the form of a cone 27 which is carried by the wall 24. In the illustrated examle, this cone 27 forms part of and is integral with an elongated sleeve 28 which is vertically shiftable on a rivet 29, so that the indicating means 27 can be moved up and down. A spring 30 is situated in a groove adjacent the bottom end of the sleeve 28, and at one location this groove forms an extension of a slot passing through the wall of the sleeve 28, so that the spring 30 frictionally engages the exterior surface of the rivet 29, and as a result of this frictional engagement between the spring 30 and the rivet 29 the sleeve 28 together with the indicating means 27 carried thereby will be maintained at the elevation in which the indicating means 27 is placed by the operator. Furthermore, the rivet 29 is provided at its upper unillustrated end with a stop extending over an interior projection or upwardly directed shoulder of the sleeve 28 so as to limit the upward movement of the indicating means 27 to an elevation corresponding to the minimum elevation of the stylus 26. In this way, any possible engagement between the indicating means 27 and the stylus is avoided. It is also within the scope of our invention, however, to arrange this stop at a relatively high elevation so that it only serves to prevent loss of the sleeve 28, by preventing the latter from being separated from the rivet 29. Moreover, the indicating means 27 can be made of a relatively soft or yieldable material, so that in the event that there is engagement between the indicating means and the stylus, the indicating means is capable of yielding so as to prevent damaging of the stylus. Furthermore, the structure which supports the indicating means for elevational movement can take forms other than a shiftable sleeve. For example, instead of a rivet 29 a screw can be used so that an internally threaded sleeve can be turned along the screws in order to change the elevation of the indicating means. In this case, the sleeve 28 would take the form of a nut turnable along the outer threads of such a screw.

An adjustable mounting means of our invention mounts the cartridge 25 of the pick-up head 21 for longitudinal shifting movement with respect to the pick-up head 21. For this purpose, the mounting means of our invention includes a carriage which carries the cartridge 25 and which is guided for longitudinal movement by a guide member which is carried by the pick-up head 21. Also, the adjustable mounting means includes a step-down transmission which is actuated by the operator to bring about the adjustment and which steps down the extent of movement of the cartridge in response to actuation of the transmission by the operator, so that in this way an extremely fine adjustment of the location of the stylus 26 can be achieved. Thus, a precise determination of the location of the stylus 26 with respect to the indicating means 27 can be provided with such a construction.

Figure 7:
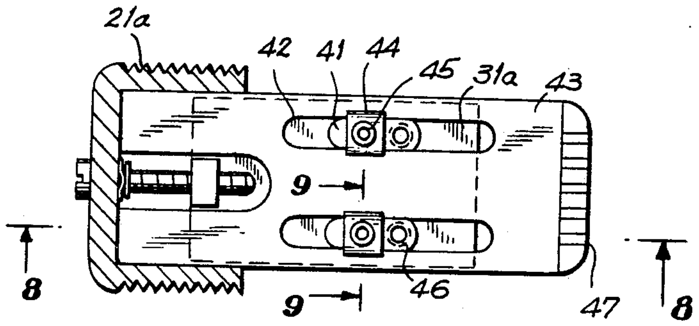
FIG. 7 is a partly sectional plan view of one possible embodiment of an adjustable mounting means of our invention, this adjustable mounting means being used to mount a cartridge for adjustable movement with respect to an arm which carries the cartridge.
Figure 8:
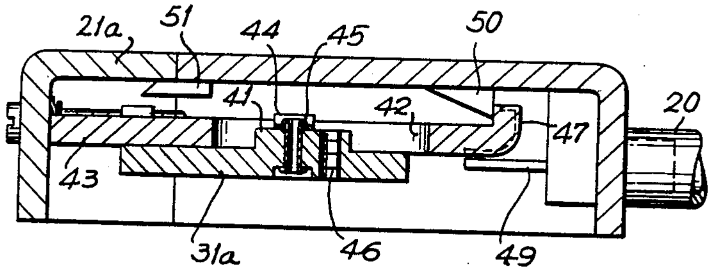
FIG. 8 is a longitudinal sectional elevation of the structure of FIG. 7 taken along line 8—8 of FIG. 7 in the dircetion of the arrows.
Figure 9:
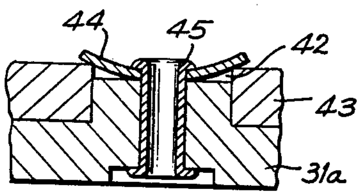
FIG. 9 is a fragmentary transverse section taken along line 9—9 of FIG. 7 in the direction of the arrows.

FIG. 4 illustrates a simplified carriage assembly which may be further refined in the manner shown in detail in FIGS. 7–9. As is apparent from the transverse section of FIG. 5, the cartridge 25 is releasably fixed by suitable screw members to a carriage 31 which is provided with a dovetail slot receiving a correspondingly shaped dovetail guide member 32 which is fixed to the arm means, and in particular to the pick-up head 21 thereof. Thus, the guide member 32, which is of T-shaped cross section, is directly fixed to the housing of the pick-up head 21 as by being formed integrally therewith. The step-down transmission of the adjustable mounting means is formed in the illustrated example by a rotary screw member 33 accessible to the operator so that the operator can turn this screw member 33, and the screw member 33 is supported for rotary movement by the pick-up head 21. At one end, the carriage 31 is provided with an upwardly directed flange 34 formed with a threaded bore through which the screw member 33 is threaded, and since the screw member 33 is carried by the housing of the pick-up head 21 only for rotary movement and cannot move axially, the turning of the screwhead 33 by the operator will result in axial displacement of the carriage 31 along the guide member 32 and thus in axial displacement of the cartridge 25 and the stylus 26 carried thereby. An elongated leaf spring 35 has a pair of free ends pressing against the pick-up head 21 but otherwise unconnected thereto, and this leaf spring extends between the carriage 31 and the guide member 32 in the manner shown most clearly in FIG. 5, so that in this way any play between the carriage and its guide member is eliminated and at the same time the leaf spring serves the purpose of an electrical screen. A springy ring 37, in the form of a suitable snap ring situated in a groove of the screw 33, for example, is situated adjacent the left wall of the housing of the pick-up head, as viewed in FIG. 4, and a springy washer 36 surrounds the screw 33 and engages the ring 37 so as to urge the head of the screw against the exterior end surface of the pick-up head shown at the left in FIG. 4, and in this way the screw 33 is supported for rotary movement but cannot move axially. FIG. 4 also shows the left end of the spring 35 pressing against the inner surface of the left end wall of the pick-up head 21 in FIG. 4.

The above-described structure of our invention operates in the following manner:

After a selected cartridge 25 is fixed to the carriage 31, the arm means 20 is placed on the support means 22 and is secured thereon by the springy clamp 23. Then, the sleeve 28 which normally engages the wall 24 and is in a lower end position is carefully raised by the operator until the upper tip of the indicating means 27 is in the region of the stylus 26 without engaging the latter. In the event that the tip of the cone 27 does not coincide with the stylus, the operator turns the step-down transmission formed by the screw 33 until coincidence between the stylus and the indicating means 27 is achieved. In this way, the stylus 26 will be precisely situated at the proper distance from the vertical turning axis of the arm means, and thus the effective length of the arm means required for proper geometry of the entire system is achieved. The tangent error, during movement of the stylus along a record, is maintained at a minimum range of variation, and thus the full reproduction quality of the system and of the record player will be apparent even with stereo recordings.

Figure 6:
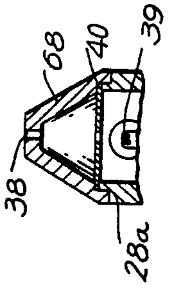
FIG. 6 is a fragmentary longitudinal sectional elevation of a furhter embodiment of an indicating means according to our invention.

The conical configuration of the indicating means 27 provides a good visibility for the adjustment. However, other constructions are possible in accordance with our invention. Thus, in FIG. 6 there is shown in section the upper tapered portion of a differently constructed sleeve 28*a*. The upper end of this embodiment is flat and formed with a fine bore 38 which passes through the upper flat wall and has a small diameter, this bore 38 serving as the indicating means. In addition, in order to facilitate the adjusting operations, there is situated within the hollow sleeve 28*a* a lamp 39 situated beneath an opaque plate 40 formed with a central small opening coaxial with the bore 38, so that a fine pencil of light in the form of a light beam of small diameter is directed upwardly by this construction. This light beam in itself forms an indicating means in accordance with this particular embodiment of our invention. When the stylus 26 intersects the light beam during adjustment of the location of the stylus 26, the stylus becomes illuminated and thus the achievement of the proper position of the stylus 26 becomes immediately apparent to the eye of the operator. Furthermore, illuminated indicating means can take many different forms in accordance with our invention. For example, it is of advantage to provide a conical indicating means 27 in the form of a clear transparent body, and to arrange a lamp beneath such a body. The tip of the cone 27 will in this case become illuminated in a particularly intense manner with respect to the remainder of the cone which is also illuminated, and thus the stylus 26 will become illuminated as it approaches the tip of the cone 27. In this way, it is possible to achieve on the one hand a very high accuracy in the adjustment as a result of the increased brightness of the structure which is to be adjusted, and on the other hand the operations which are required to be carried out by the operator are simplified. As a result of the full illumination of the stylus, it is possible to maintain the range of adjustment within smaller limits.

FIGS. 7–9 show further details of an adjustable mounting means of our invention for providing a fine adjustment in the position of the stylus with respect to the indicating means of our invention. The structure of FIGS. 7–9 is basically similar to that of FIG. 4 and is actuated in the same way in order to produce the required adjustment. In FIGS. 7–9, however, the pick-up head 21 is divided into a pair of housing portions 21*a* and 21*b*, the portion 21*a* forming an element capable of being gripped by the operator while the remainder of the housing 21*b* is shown in FIG. 8.

The carriage 31*a* of this embodiment includes a pair of guide portions 41 respectively received in slots 42 which are parallel to each other and which are formed in the guide member 43 which is fixed to the front grip portion 21*a* of the pick-up head. By providing a pair of elongated projections 41 having opposed side surfaces slidable engaging the side surfaces of the guide slots 42, a doubling of the guiding is achieved with a resulting increase in accuracy, this accuracy being further increased by the large area of contact between the carriage 31*a* and the guide member 43 which is formed with the parallel guide slots 42. The pressure with which the carriage presses against the lower surface of the guide member 43 is provided by way of a pair of leaf springs 44 which respectively have central portions fixed to elongated hollow rivets 45 (FIG. 9) these rivets passing through and being fixed to the portions 41, respectively, of the carriage 31*a*. As is particularly apparent from FIGS. 8 and 9, the projections 41 do not pass completely through the slots 42 so that these projections have upper surfaces which are located closer to the lower surface of the guide member 43 than the upper surface of the guide member 43. The leaf springs 44 extend beyond and engage the upper edges of the slots 42 at the upper surface of the guide member 41. In this way, the leaf springs 44 coact with the other elements to provide a reliable springy mounting of the carriage 31*a* on the guide member 43 with the upper surface of the carriage slidably engaging the lower surface of the guide member 43, and all play is eliminated from the double-guiding structure. In addition, the width of the carriage 31*a* corresponds to the interior width of the front grip portion 21*a* of the pick-up head so that the side surfaces of the carriage will slidably engage the inner side surfaces of the grip portion 21*a*, and in this way an additional guiding is achieved.

In order to mount the cartridge which is not illustrated in FIGS. 7–9, the carriage 31*a* is provided with the threaded bores 46. These bores 46 are spaced from each other by a distance of one-half inch (12.7 mms.) a distance which is proper for most cartridges. For the relatively small number of cartridges which do not have fastening openings situated from each other by this distance, it is possible to initially connect to the carriage an adapter plate having holes which match the spacing between the threaded bores 46, and this adapter plate will of course be capable of having the cartridge fixed thereto.

The structure of the invention is not only highly favorable from an optical standpoint but also from a geometric standpoint. One cartridge can be exchanged for another with great ease and without any fear of subsequent faults, at any time, without any particular limitation on the type of cartridge which is used. For test purposes or for different musical compositions it can be considerably disagreeable for the particular amateur to have to check-out different cartridges in order to determine which provides the best quality of sound reproduction so as to achieve what appears to the individual to be the optimum sound reproduction.

Frequent changes of the cartridges can be additionally simplified by fixing the carriage guide 43 to the grip 21*a* of the pick-up head, as shown in FIGS. 7 and 8. FIG. 7 shows the grip portion 21*a* removed from the remainder of the housing of the pick-up head and carrying the guide member 43 which projects freely from the grip 21*a*. In this way, the fastening openings 46 are rendered freely accessible. The guide member 43 is provided with the contacts 47 along which the conductors 49 of the plug 48 (FIG. 4) are guided, respectively. The assembly of both sections of the pick-up head is apparent from FIG. 8. The end of the guide member 43 which is distant from the grip 21*a* is placed over the springy contacts 49, which are fixed to the housing portion 21*b*, and the upwardly directed rear end of the guide member 43 snaps behind the catch 50 carried by the lower surface of the top wall of the housing portion 21*b*. The housing portion 21*b* additionally carries at its front end a projection 51 which engages the lower surface of the top wall of the grip 21*a*, so that when the parts are assembled as shown in FIG. 8 it is not possible for the grip 21*a* and the structure carried thereby to turn downwardly with respect to the housing portion 21*b*. In order to disassemble the grip 21*a* from the housing portion 21*b* it is necessary for the operator to turn the grip 21*a* in a clockwise direction, as viewed in FIG. 8, so as to displace the right end of the guide member 43 downwardly in opposition to the force of the springy contacts 49, and then the grip 21*a* and the structure carried thereby can be displaced forwardly away from the housing portion 21*b*.

The adjustment of the stylus carried by the unillustrated cartridge which is connected to the carriage 31*a* of FIGS. 7–9 is brought about in the manner described above in connection with FIG. 4. Thus, FIGS. 7 and 8 show a rotary screw member which forms the step-down transmission of the adjustable mounting means of this embodiment, this screw member being threaded through an upwardly directed projection at the front end of the carriage, this projection and the screw member being situated in a slot formed in the front region of the guide member centrally between its side edges and extending all the way up to the front wall of the grip 21*a*, as is particularly apparent from FIG. 7.

In the same way that the details of the adjustable mounting means of our invention are not limited to those shown in FIGS. 4, 5, and 7–9, it is also possible for the indicating means of our invention to take many different forms and arrangements. FIGS. 10–16 illustrate various examples of different indicating means in accordance with our invention.

Figures 10, 11:
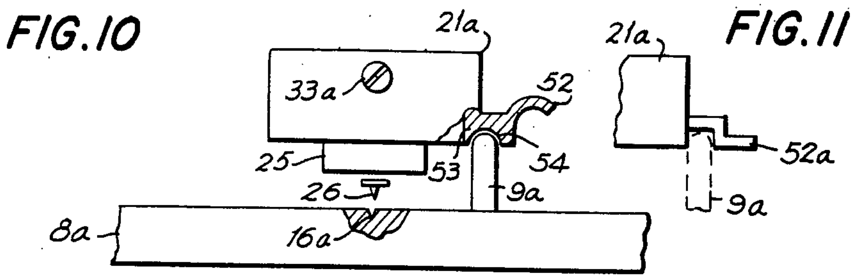
FIG. 10 is a fragmentary partly sectional elevation showing the details of a structure which operates according to the arrangement illustrated in FIG. 3.
FIG. 11 is a fragmentary elevation showing a variation of the structure of FIG. 10.

In FIG. 10 there is illustrated a construction which operates in the manner indicated in FIG. 3. The turntable 8*a* which is fragmentarily indicated in a side elevation in FIG. 10 is provided with a groove 16*a* extending along a circle coaxial with the spindle 9*a* and forming the indicating means of this embodiment. FIG. 10 schematically illustrates a cartridge 25 and the stylus 26 as well as the step-down transmission 33*a* of the adjustable mounting means. The pick-up head 21*a* is provided with an integral handle 52 which may be used for manipulating the arm means. This handle 52 is integral with the wall 53 of the pick-up head. At its lower surface the handle 52 and part of the wall 53 are formed with a recess 54 capable of receiving the top end of the spindle 9*a*, in the manner shown in FIG. 10, and having a configuration complementary to and matching that of the top end of the spindle 9*a*, so that when the top end of the spindle 9*a* is received in the recess 54 the arm means will have a predetermined location. Now the operator can turn the screw 33a so as to adjust the location of the stylus 26, bringing it into coincidence with the circular indicating means 16a. Of course, it is possible to provide other constructions, including the spindle-receiving recess, of the handle for resting the arm means on the spindle. Thus, in FIG. 11 the handle 52a has the stepped configuration illustrated so as to form in this way a structure suitable for resting on the top end of the spindle 9a so as to provide a predetermined location for the arm means during adjustment of the stylus with respect to the indicating means. It will be noted from FIG. 11 that the stepped portion of element 52a defines with the outer side surface of the pick-up head 21a a recess for receiving the top end of the spindle 9a.

A further advantage of our invention resides in the fact that it easily lends itself to the addition of a structure according to our invention to record players which have already been constructed and which are already used. FIGS. 12–15 illustrated structures which may be added to already complete record players which may in fact already be in use.

Figure 12:
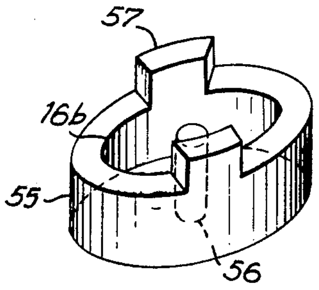
FIG. 12 is a perspective illustration of another embodiment of an indicating means of our invention.

Referring to FIG. 12, there is shown therein an adapter cylinder 55 for disc records which have a central opening larger than the diameter of the spindle. This adapter 55 carries the indicating means of our invention in this embodiment. Thus, the adapter 55 has a central bore 56 for receiving the spindle and, in accordance with our invention, the adapter 55 carries at its upper surface a circle 16b coaxial with the bore 56 and forming the indicating means of this embodiment. In this way, the adapter serves the additional function of forming a support for the indicating means 16b which may be in the form of a raised rib of circular configuration or in the form of a groove cut into the top surface of the adapter. In addition, the adapter 55 is provided with a pair of upper projections 57 on which the arm means can rest during adjustment of the location of the stylus. These supports 57 for the arm means can of course take many different forms, and the same is also true of the indicating means carried by the adapter 55. Moreover, a separate body, which need not be an adapter for a record with a large central opening and which need not coact with the spindle can be provided to be mounted on the record player at a predetermined location and to coact with a handle 52 or 52a in the same way that the spindle 9a coacts therewith, such a body carrying an indicating means and providing a predetermined location for the arm means during adjustment of the stylus. Such a separate body which carries the indicating means of our invention can also coact with other parts of the arm means, such as with another part of the pick-up head, for example.

FIG. 13 shows an indicating means of our invention having the configuration of a pyramid while FIG. 14 shows an indicating means of our invention having the configuration of a relatively flat hexagonal pyramid 66 carrying at its top end a slender tapered indicating means 67 of pointed configuration and serving to determine the adjustment of the stylus. This construction renders a precise adjustment easy to carry out and the tapered portions 67 serves as a convenient handle for the structure shown in FIG. 14. Thus, the operator can readily grasp the tapered pointed portion 67 so as to set the body 66 at a predetermined part of the record player. This tapered portion 67 can be made of a yieldable material such as a material having the properties of soft rubber, for example, so that if the indicating means 67 should engage the stylus it will not damage the latter.

Indicating means having the construction shown in FIGS. 13 and 14 can be interchangeably mounted on the upper plate of the record player housing. For example, the base or bottom surfaces of these indicating structures can be provided with a pressure-sensitive adhesive coating, so that the indicating means of these embodiments are capable of having self-adhering properties for releasably maintaining them at a predetermined location on the record player. Thus, these structures can readily be placed on the record player at a predetermined distance from the turning axis of the arm means. This predetermined distance need only, for example, extend up to an edge of the base of the indicating means. It is also possible, for example, to provide bodies as shown in FIGS. 13 and 14 which are of a clear transparent material, and in such a case the base of the body may be provided with an indicating means 58 (FIG. 13) in the form of a pair of intersecting crosshairs, for example. Thus, by situating the intersecting crosshairs 58 at a predetermined location on the record player, the location of the indicating means can be readily determined and in addition a precise adjustment of the stylus can be carried out. If desired, however, the indicating means which is attached to the already constructed record player can have a plug-and-socket type of connection thereto.

In FIG. 15, the structure includes a pair of elastic yieldable plugs 59 made of soft rubber or a material of similar properties and capable of being received in a pair of openings formed in the upper wall 7a of the record player housing, as indicated in FIG. 15. These projections 59 can simply snap into openings formed in the walls 7a. It is also possible to mount on the turntable an indicating means having a plug similar to one of the plugs 59 and capable of being received in a suitable opening such as in a central opening of the turntable.

Furthermore, according to yet another embodiment of a structure according to our invention, the structure which carries the indicating means can also carry an optical magnifying means in the form of a magnifying lens 60 (FIG. 15). In the embodiment of FIG. 15, the body which carries the indicating means has a pair of limbs which extend angularly with respect to each other, one of these limbs being fixed to the resilient compressible plugs 59 and resting directly on the wall 7a while the other of the limbs carries the magnifying lens 60. The limb of the body 61 which engages the wall 7a carries the indicating means 27a, while the upwardly extending limb, which carries the magnifying lens 60, forms at its top end a support for the pick-up head 21b of the arm means. For this purpose, the top end of the upwardly directed limb of the angular body 61 has the fork-shaped configuration shown in FIG. 15, so that the wall 53b of the pick-up head 21b can be received in the recess formed by the upper portion 62 of the upwardly directed limb of the angle body 61. By way of the magnifier 60, it is possible to achieve an increased precision in the adjustment. Such a construction for providing a magnified image of the stylus and indicating means can also be used with other embodiments of our invention, such as with the adapter 55 of FIG. 12 and with the sleeve 28 of FIG. 4. Of course, instead of a plug-type of connection, the lower limb of the body 61 can have a threaded or adhesive connection to the wall 7a.

In accordance with a further feature of our invention, it is desirable to provide the indicating means 27a with a size and configuration corresponding to that of the stylus 26. Because of the use of the magnifying lens 60, the relatively small structure of such an indicating means is rendered immaterial and there is provided in this way the advantage of rendering the symmetrical coinciding positioning of the tip of the indicating means and the tip of the stylus one with respect to the other immediately and clearly apparent to the eye.

Our invention is of course not limited to the particular embodiments illustrated and described above, since the structure of our invention may take many different forms, and in particular the individual details are not essential to the various embodiments in which they are described. Furthermore, it is by no means essential that the structure which carries the indicating means be mounted on the upper wall of the record player housing or on the turntable in such a way that this structure rests on the top surface of the upper wall or on the top surface of the turntable.

Thus, there is shown in FIG. 16 an embodiment of our invention where a body 63 carries and forms a support means for indicating means 14*a* in the form of an indentation having substantially the configuration of a point and formed in the top surface of the body 63. With this embodiment the body 63 is capable of being lowered through an opening in the upper wall 7*b* of the record player housing. In order to raise the body 63 so as to situate the indicating means 14*a* carried thereby at a suitable elevation for adjusting the location of the stylus, this body 63 may be mounted on many different types of structures capable of raising and lowering the body 63. In the particular embodiment illustrated in FIG. 16 a lever 65 is pivotally supported intermediate its end on a suitable bracket fixed to the lower surface of the wall 7*b* in the interior of the record housing, and a spring is connected to the bracket and to the lever 65 so as to urge it to the rest position shown in FIG. 16. The right end of the lever 65 of FIG. 16 is pivotally connected to a bracket fixed to the lower surface of the body 63, while the left end of the lever 65 is pivotally connected to a bracket fixed to the lower surface of a knob 64 which extends through a suitable opening of the wall 7*b* and which is accessible to the operator. Thus, the operator need only depress the knob or button 64 in order to raise the body 63 which will remain projecting above the wall 7*b* as long as the operator maintains the button 64 depressed. As soon as the operator releases the button 64 the body 63 disappears into the interior of the record player housing. This action takes automatically as a result of the spring which serves to raise the button 64 to the position illustrated in FIG. 16. It is also possible to provide other constructions, such as, for example, those known in the electrical switch art, by means of which one depression of the button 64 will raise the body 63 and another depression of the button 64 will cause it to move down to its inoperative position shown in FIG. 16.

It is also within the scope of our invention to situate the indicating means directly on a disc record. For example, the central lable of such a disc record can be provided with a circular ring corresponding to the ring 16 of FIG. 3, such a circle being imprinted on the lable and serving as an indicating means to determine the location of the stylus in the manner described above.

We claim:

1. In a record player, a housing having an upper wall, a rotary turntable situated at said upper wall of said housing and having a spindle whose axis coincides with the axis of rotation of said turntable, arm means operatively connected to said housing for turning movement with respect thereto about a turning axis which is parallel to said spindle, said arm means when turning about said turning axis moving over an area part of which is located at said upper housing wall and part of which is located at said turntable, a cartridge carried by said arm means, a stylus carried by said cartridge, adjustable mounting means adjustably mounting said cartridge on said arm means for adjustable movement with respect thereto, and indicating means situated at said area for indicating the proper distance between said stylus and said turning axis, whereby said adjustable mounting means can be actuated to move said cartridge with respect to said arm means until said stylus is at the proper distance from said turning axis, as indicated by said indicating means.

2. The combination of claim 1 and wherein a support means is carried by said upper wall of said housing for supporting said arm means in a rest position, said indicating means being carried by said upper wall of said housing for indicating the proper location of said stylus when said arm means is in said rest position thereof.

3. The combination of claim 2 and wherein an elevation-adjusting means is operatively connected with said indicating means for adjusting the elevation thereof.

4. The combination of claim 2 and wherein said indicating means has opposed upper and lower ends, said upper end of said indicating means coacting with said stylus for indicating the proper location thereof, and elevation-adjusting means operatively connected with said lower end of said indicating means for adjusting the elevation of the latter.

5. The combination of claim 3 and wherein said adjusting means is yieldable for yielding with respect to said stylus upon engaging the latter so as to prevent damaging of said stylus.

6. The combination of claim 1 and wherein said indicating means is of a circular configuration and is situated at said turntable coaxially surrounding said spindle, and positioning means engaging said spindle for positioning said arm means at a predetermined location with respect to said spindle when said adjustable mounting means is actuated to adjust the location of said stylus with respect to said indicating means.

7. The combination of claim 6 and wherein said positioning means is operatively connected with said cartridge and has the configuration of a handle accessible to the operator and also available for manipulating said arm means.

8. The combination of claim 1 and wherein a support means carries said indicating means and is situated at said area, said support means having a portion which supports said arm means to situate the latter at a predetermined location during adjustment of said adjustable mounting means to properly locate said stylus with respect to said indicating means.

9. The combination of claim 1 and wherein a support means carries said indicating means, said support means being removably mounted at said area so that said support means and said indicating means therewith may be removed from said area.

10. The combination of claim 9 and wherein said support means has a self-adhering connection to said area.

11. The combination of claim 1 and wherein an optical magnifying means coacts with said indicating means and stylus for providing a magnified image of the relationship therebetween.

12. The combination of claim 1 and wherein a support means carries said indicating means and is in the form of an angle member having a pair of limbs one of which engages said area and carries said indicating means, the other of said limbs of said angle member extending upwardly from said one limb thereof and forming a support for said arm means to determine the position thereof during actuation of said adjustable mounting means to adjust the location of said stylus with respect to said indicating means.

13. The combination of claim 12 and wherein said other limb of said angle member carries an optical magnifying means for providing a magnified image of the relationship between said indicating means and said stylus.

14. The combination of claim 1 and wherein a support means carries said indicating means and is removably located at said spindle for removably positioning said indicating means at said spindle during adjustment of the location of said stylus.

15. The combination of claim 14 and wherein said support means includes an adapter formed with a central bore for receiving said spindle and having an outer diameter for accommodating disc records which have central openings larger than that of said spindle.

16. The combination of claim 1 and wherein said adjustable mounting means includes a carriage carrying said cartridge, a carriage guide carried by said arm means and guiding said carriage for movement, and a step-down transmission coacting with said carriage for moving the latter with respect to said guide so as to provide a fine adjustment of the location of said stylus with respect to said indicating means.

BEST AVAILABLE COPY

17. The combination of claim 16 and wherein said guide which is carried by said arm means provides for said carriage a pair of elongated parallel guiding portions.

18. The combination of claim 17 and wherein at least one of said guiding portions includes a member forming part of said guide which is connected to said arm means, said member being formed with an elongated slot passing therethrough and said member having upper and lower surfaces, said carriage slidably engaging said lower surface of said member and having a projection extending into said slot and guided for longitudinal movement therealong by said member, said projection having an upper surface located nearer to said lower surface of said guide member than said upper surface thereof, so that said projection extends only part of the way through said slot, and a leaf spring fixed to said upper surface of said projection and engaging and extending beyond edges of said slot which are situated at said upper surface of said guide member, so that said spring urges said carriage against said lower surface of said guide member.

19. The combination of claim 1 and wherein a hollow support means carries said indicating means, and illuminating means situated in said hollow support means for illuminating said indicating means.

20. The combination of claim 1 and wherein a transparent support means carries said indicating means.

21. The combination of claim 1 and wherein said indicating means is in the form of a beam of light.

22. The combination of claim 1 and wherein a transparent support means is situated at said area and carries said indicating means, said transparent support means having a base surface engaging said area and said indicating means being in the form of an index situated at said base surface.

23. The combination of claim 1 and wherein said indicating means has a size and configuration substantially matching that of said stylus.

References Cited

UNITED STATES PATENTS

| | | | |
|---|---|---|---|
| 3,369,816 | 2/1968 | Zahner | 274—24 |
| 3,356,374 | 12/1967 | Tourtellot et al. | 274—24 |
| 3,059,934 | 10/1962 | Urmenyi. | |
| 2,557,752 | 6/1951 | Miner | 274—24 |
| 2,529,676 | 11/1950 | Carris. | |
| 2,455,529 | 12/1948 | Shortt. | |

LEONARD FORMAN, Primary Examiner

E. J. D'AMBROSIO, Assistant Examiner